Patented Oct. 3, 1939

2,174,554

UNITED STATES PATENT OFFICE 2,174,554

COLORED GLASS

Frank J. Dobrovolny, Ransomville, John M. Youel, Lewiston, and Harold E. Klein, Niagara Falls, N. Y., assignors to E. I. du Pont de Nemours & Company, Wilmington, Del., a corporation of Delaware No Drawing. Application December 15, 1937, Serial No. 179,866

9 Claims. (Cl. 106—36.1)

This invention relates to the production of ruby glass and more particularly to the production of copper ruby glass.

Copper ruby glass, i. e. ruby or red glass produced by the addition of a copper compound or copper to the glass batch, has been produced heretofore by fusion of the glass batch under carefully controlled conditions. Thus, so far as we are aware, it has been necessary in prior methods to effect fusion in closed pots in order to protect the contents of the pot from the furnace atmosphere. One disadvantage of such a method is that transfer of heat to the pot contents is inefficient, the transfer being entirely through the pot walls or cover. Even under these conditions, control of color intensity in the final ware has been difficult and in general unreliable.

It is an object of our invention to provide an improved method for preparing copper ruby glass wherein the above disadvantages of the methods heretofore employed are overcome to a large extent or entirely eliminated. A further object is the provision of an improved method wherein fusion may be carried out in open pots or tanks under heating conditions which need not be carefully controlled. A particular object is to provide an improved method for preparing copper ruby glass which permits of more effective and reliable control of the intensity of color in the final ware than has been possible by methods practiced heretofore. A still further object is to provide improved addition agents for glass batches which are to be used in the production of copper ruby glass. These and other objects will be apparent from the ensuing description of our invention.

The above objects may be accomplished in accordance with our invention by adding a suitable cyanogen compound to a glass batch which contains, in addition to the usual batch ingredients, a copper compound and thereafter fusing the resulting mix. Suitable cyanogen compounds for the present purpose are the metal cyanides, including the simple and complex metal cyanides, metal cyanates and metal cyanamides. Of course, the metal cyanides and particularly the alkali metal cyanides, e. g. sodium cyanide, are preferred.

We have discovered that the use of these cyanogen compounds effects the development of color uniformly throughout the resulting ware, facilitates the control of color intensity in the ware and obviates the necessity of carrying out the fusion operation under carefully controlled conditions, e. g. in closed pots. The use of open pots or tanks results in recognized advantages among which is a more efficient transfer of heat to the batch being fused since flame and radiant heat is applied directly to the surface of the batch. Furthermore, careful control of the flame as regards its reducing or oxidizing character is not necessary when practicing our invention even though the melt is directly exposed to the flame as, for example, in an open pot or tank. It is thus apparent that our method involving the use of the above cyanogen compounds overcomes many of the important disadvantages characteristic of earlier methods and that it is well suited for commercial operation.

The intensity of the red color in the ruby glass produced by the present method may vary depending upon various factors which are discussed below. It is therefore to be understood that our invention is not restricted to the production of red or ruby glass of a specific range of color intensity but covers any copper ruby glass, i. e. any red glass produced by the use in a glass batch of a copper compound or mixture of such compounds in conjunction with one or more of the above cyanogen compounds.

The following examples illustrate the production of ruby glass in accordance with our invention:

Example 1

A glass batch is prepared containing the following ingredients:

| | Parts by weight |
|---|---|
| Sand | 110 |
| Potassium carbonate | 10 |
| Sodium carbonate | 40 |
| Calcium oxide | 13 |
| Aluminum oxide | 3.5 |
| Cuprous oxide | 0.25 |
| Stannous oxide | 0.32 |
| Sodium cyanide | 1.25 |

The mix is charged into a glass tank and fused in the usual manner after which the melt is subjected to the usual fining treatment for the removal of bubbles therefrom. The glass melt is then worked to obtain ware having an excellent bright ruby color. In general, the ruby color in glass from the above batch strikes readily. However, occasionally it is necessary to subject the ware to a mild warming-in treatment in order for the color to develop properly.

Example 2

A similar ruby glass is obtained by substituting cuprous cyanide in place of cuprous oxide in the glass batch given in Example 1. In this case, less sodium cyanide need be used since the cuprous cyanide serves as part of the addition agent as well as the source of copper.

Metal cyanates or cyanamides may be used with good results in place of the sodium cyanide in Example 1 although the metal cyanides, particularly the alkali metal cyanides, are somewhat superior thereto and are preferred.

Our invention is not limited to the use of the glass batches of the above compositions which are given merely for the purpose of illustration. Any of the usual copper ruby glass formulae may be employed with excellent results. In general, however, the presence of calcium oxide and aluminum oxide in the batch is desired in that these substances tend to improve the color of the final product. The presence of stannous oxide, although not essential, is generally desirable in that it improves the color striking property of the glass. Aluminum oxide also causes the color to strike more readily and this effect appears to increase somewhat as the proportion of aluminum oxide is increased. However, the amounts of these constituents may vary within wide limits and the optimum amounts for a given batch may be readily determined by any skilled glass maker.

An important advantage resulting from the use of our cyanogen compounds in the production of copper ruby glass is that such use makes possible an effective method for controlling the intensity of color in the final product. Control of color intensity in copper ruby glass has always been a difficult problem with the art. However, by employing our improved addition agents and especially by adjusting the amounts of both the copper compound and the cyanogen compound in the batch, the color intensity may be controlled substantially as desired. The depth of color may be adjusted to a certain extent by varying the amount of copper compound employed in the batch but for reasons which are not entirely apparent this method is not especially reliable. We have discovered that adjustment of the amount of copper compound may be supplemented effectively by adjusting the amount of cyanogen compound employed. In general, ware having a given color intensity may be produced using a relatively large or small amount of copper compound, e. g. cuprous oxide, provided the proper amount of cyanogen compound is employed in conjunction therewith. Thus, a relatively small amount of cuprous oxide in conjunction with a relatively large amount of sodium cyanide may be used to give substantially the same color intensity as may be obtained with a comparatively large amount of cuprous oxide and a comparatively small amount of sodium cyanide. It is therefore apparent that adjustment of the amount of sodium cyanide greatly facilitates the control of color intensity by varying the amount of copper compound.

The particular cyanogen compound or mixture of such compounds that is best employed in a glass batch will depend upon the other batch ingredients as well as upon the color requirements of the desired ware. The alkali metal cyanides, e. g. sodium cyanide, are generally suitable for use in any copper ruby glass batch and their use is generally preferred in that it does not involve the introduction of metallic constituents which impart color to the glass. However, the use of cyanogen compounds which introduce metals imparting color is not necessarily objectionable and may frequently be desirable in that glass having a modified ruby color may be obtained as a result of such use. Thus, although iron and cobalt compounds impart color to glass, cyanogen compounds, e. g. complex metal cyanides, of these metals may be used in controlled amounts either alone or in combination with alkali metal cyanides as addition agents in accordance with our invention to produce glass having a modified ruby color. The effect of such metals in the glass may be to mask an undesirable color normally present or to produce a blended color.

No satisfactory explanation is apparent as to how our cyanogen compounds function to produce the beneficial results attending their use. The suggestion that they function as reducing agents is not entirely satisfactory in that it does not explain their beneficial action in accelerating the development of color and in their action in varying the intensity of color when varying amounts are employed in conjunction with a given amount of copper compound. A correct explanation of their mode of action would undoubtedly involve many factors whose importance and relationships to each other are not apparent. It may be definitely said, however, that the beneficial results accruing from the use of these compounds in accordance with our invention are due in large part to the fact that these compounds, i. e. metal cyanides, cyanates and cyanamides, dissolve readily during the fusion treatment so that their beneficial action is exerted uniformly throughout the melt.

Because the present cyanogen compounds are readily soluble in the glass melt, they may be added if desired to the melt instead of to the batch prior to the fusion operation. However, we have found it generally to be more convenient to add the material directly to the glass batch as illustrated in the above examples.

Our invention is not limited to the use of any specific amount of the cyanogen compound in the glass batch. The optimum amount for a given batch will depend in part upon the particular ingredients, e. g., the copper compound and the cyanogen compound employed, the intensity of color desired in the final product and also to some extent upon the conditions under which the glass batch is fused. In addition, it will also depend upon the general ingredients of the glass batch. As has been pointed out above, ingredients such as calcium oxide, aluminum oxide and stannous oxide tend to modify somewhat the final color as well as also to affect somewhat the rate of color development. It may be said, however, that an amount not exceeding about 1 to 2 parts per 100 parts of sand is sufficient to produce generally satisfactory results, although larger amounts, e. g. amounts equal to 5 to 10 parts by weight of the batch, may be used in specific cases.

The desired final ratio of basic to acidic constituents of the glass should be considered in connection with the amount of cyanogen compound to be used. When relatively large amounts of cyanogen compound are employed, e. g. amounts equal to from 5 to 10% of the weight of the batch, it may be necessary to increase the acidic ingredients, e. g. sand, of the batch in order to insure the desired ratio of basic to acidic constituents of the final glass. Relatively small amounts, e. g. 1 to 2 parts per 100 parts of sand, may generally be used without correspondingly adjusting the ratio of basic to acidic ingredients; however, such adjustment may be made if desired.

While the use of the above cyanogen compounds renders the melt less sensitive to the furnace atmosphere, it is generally necessary to employ an amount of cyanogen compound corresponding somewhat to the oxidizing strength of the furnace atmosphere. Thus, with a strongly oxidizing atmosphere, a relatively large amount of cyanogen compound is generally required. The beneficial effects of the cyanogen compound in the melt is, however, exerted over a prolonged period of time, e. g. for 1 to 2 days, so that relatively small amounts, e. g. 1 to 2 parts per 100 parts of sand, are generally sufficient even though the furnace atmosphere is slightly oxidizing.

Our invention is not restricted to the use of any specific amount of copper compound in the batch since the amount will necessarily vary considerably depending upon the particular compound used and also upon the intensity of color desired. There is usually no advantage in using more than, for example, about 0.5 part of cuprous oxide per 100 parts of sand and about 0.2 to 0.25 part gives generally satisfactory results. However, as little as 0.02 part of cuprous oxide may be used in conjunction with, for example, sodium cyanide to produce ware having a good ruby color. Copper compounds other than cuprous oxide, e. g. copper salts such as the carbonate, sulfate, chloride and the like, may be used although the oxide is preferred for reasons of economy.

We have described our invention in connection with the production of ruby glass of the type illustrated. However, our invention may be practiced to produce glasses of other types, for example, glasses which are relatively high in acidic constituents. It is to be understood that the descriptions, procedural details and examples given above are intended to be illustrative and not restrictive of our invention. The invention is to be limited only by the scope of the appended claims.

We claim:
1. A method for preparing ruby glass which comprises preparing a glass melt which contains a copper compound and a metallic cyanogen compound selected from the group consisting of metal cyanides, cyanates and cyanamides.

2. A process for preparing ruby glass comprising preparing a glass batch which includes as ingredients thereof a copper compound and a metallic cyanogen compound selected from the group consisting of metal cyanides, cyanates and cyanamides, and fusing said batch.

3. A process for preparing ruby glass comprising preparing a glass batch which includes as ingredients thereof a copper compound and an alkali metal cyanide, and fusing said batch.

4. A process for preparing ruby glass comprising preparing a glass batch which includes as ingredients thereof a copper compound and sodium cyanide, and fusing said batch.

5. A process for preparing ruby glass comprising adding copper cyanide to a glass batch and fusing the resulting mix.

6. A glass batch for the production of copper ruby glass containing as ingredients thereof a copper compound and a metallic cyanogen compound selected from the group consisting of metal cyanides, cyanates and cyanamides.

7. A glass batch for the production of copper ruby glass containing as ingredients thereof a copper compound and an alkali metal cyanide.

8. A glass batch for the production of copper ruby glass containing as ingredients thereof a copper compound and sodium cyanide.

9. A glass batch for the production of copper ruby glass containing copper cyanide as an ingredient thereof.

FRANK J. DOBROVOLNY.
JOHN M. YOUEL.
HAROLD E. KLEIN.